United States Patent [19]

Sevenants

[11] 3,857,982

[45] Dec. 31, 1974

[54] PROCESSING FOR PRODUCING POTATO CHIP FLAVOR CONCENTRATE

[75] Inventor: Michael Robert Sevenants, Forest Park, Ohio

[73] Assignee: The Procter Gamble Company, Cincinnati, Ohio

[22] Filed: Nov. 30, 1973

[21] Appl. No.: 420,727

[52] U.S. Cl. .................... 426/271, 426/65, 426/364

[51] Int. Cl. ............................................... A23l 1/26

[58] Field of Search ............ 426/65, 175, 271, 372, 426/373, 386, 221, 222, 364, 380

[56] References Cited

UNITED STATES PATENTS

| | | | |
|---|---|---|---|
| 2,589,238 | 3/1952 | Eriksen | 426/271 X |
| 3,245,804 | 4/1966 | Heegaard et al. | 426/271 X |
| 3,475,404 | 10/1969 | Johnsen et al. | 426/364 X |
| 3,619,211 | 11/1971 | Chang et al. | 426/65 |

*Primary Examiner*—Samih N. Zaharna
*Assistant Examiner*—Esther L. Massung

[57] ABSTRACT

A process for producing a potato-chip flavor concentrate which comprises the steps of heating a potato material until a browned product is formed; extracting the browned potato material with a solvent; contacting the extract with a cation-exchange resin, thereby to adsorb flavoring compounds onto the resin; and eluting the adsorbed flavoring compounds from the resin by means of a suitable solvent. Preferred process conditions involve heating comminuted potato material, slurrying the browned potato material in a water-and-alcohol extraction solvent, contacting the resulting extract with a cation-exchange resin and eluting the adsorbed flavoring material by addition of a strong base or acid. The potato-chip flavor concentrate can advantageously be added to potato chips and other potato products, especially those prepared from dehydrated potatoes.

10 Claims, No Drawings

PROCESSING FOR PRODUCING POTATO CHIP FLAVOR CONCENTRATE

BACKGROUND OF THE INVENTION

This invention relates to a process for producing a potato-chip flavor concentrate which can be added to potato-chip and like products in general but especially to potato-chip products prepared from a dough comprising dehydrated potato flour and water. More specifically, it relates to a process for preparing a potato-chip flavor concentrate by extracting browned potato-source material, treating the extract with a cation-exchange resin and eluting the adsorbed flavor fraction with a suitable eluent.

Conventional potato chips are prepared by deep fat frying thin slices of peeled raw potatoes. The raw potatoes must be stored under controlled temperature conditions to avoid changes in the reducing sugar level. In addition, processing (peeling, slicing, frying) must be carried out without delay to avoid, for example, a darkening of peeled potatoes as a result of enzymatic reactions. Differences in potato raw materials with respect to flavor content, reducing sugar content, and potato solids content, are also important and will result in flavor and appearance variations of the fried chips. Particularly, the level of reducing sugar is believed to be important to the color and flavor of the fried potato chip. Where there is too much reducing sugar, unsightly commercially unattractive chips are obtained, whereas a minimum level is required to obtain the attractive yellowish chip color.

A process which minimizes the foregoing handling problems and variations in the appearance of potato chips is described in Belgian Pat. No. 721,266, published Mar. 24, 1969. Briefly stated, the patent discloses a process for preparing formulated potato chips which comprises intimately admixing dehydrated cooked potatoes with water to form a workable and coherent dough, forming the dough into shaped pieces, and frying the pieces until they are crisp. This process provides the advantages of eliminating the foregoing handling problems and variations in the appearance of potato chips, as well as providing chips with low-fat content, i.e., 15 to 35 percent. Also, when uniformly shaped chips are made, for example as described in U.S. Pat. No. 3,576,647 to Alexander L. Liepa (Apr. 27, 1971), the chips can be formed into a large uniform stack which can be sealed in rigid, air-tight containers. Thus, the chips can be stored for long periods of time without becoming stale or breaking into small pieces, as do conventional non-uniformly shaped chips stored in conventional waxed paper bags.

Dehydrated potatoes provide a dough from which potato chips can be prepared. Chips made from such potatoes provide excellent eating quality, but sometimes lack a good potato-chip flavor. The flavor of potato chips formulated from dehydrated potatoes tends to be weaker than that of potato chips made from raw potato slices. In addition, potato chips made from raw potato slices may have perceivably different flavor levels depending upon their origin and composition as pointed out hereinbefore. Potato-chip flavor is produced during frying largely by the Maillard browning reaction wherein amino acids and reducing sugars react to form flavors, many of which are in the form of pyrazine compounds. Therefore, potato-chip flavor additives containing these naturally developed pyrazines would be very desirable to improve the taste qualities of chips made from dehydrated potatoes, and also to control the flavor level in chips made from slices raw potato.

It is, therefore, an object of this invention to produce a flavor concentrate that can be added to potato products to increase their flavor.

It is a further object of this invention to provide a process for producing a potato-chip flavor concentrate useful to confer desirable flavor properties to potato-chip and like potato products.

Other objects will become apparent from consideration of the invention described in detail hereinafter.

SUMMARY OF THE INVENTION

The present invention relates to a process for producing a potato-chip flavor concentrate which is particularly valuable for enhancing the flavor of potato-chip and like potato products. The process comprises the steps of heating a potato raw material until uniformly brown in color; extracting the browned product with water or a water and lower-alcohol mixture; contacting the extract with a cation-exchange resin; and eluting the adsorbed potato-chip flavor fraction by contact with an eluent material.

In a preferred embodiment of this process, a potato raw material is comminuted, e.g., sliced or flaked. The comminuted potato material is then heated under conditions such as to result in a material having little resemblance to the initial potato material and a flavor which is recognizably different from potato-chip flavor. The heated mass is extracted (preferably pulverized prior to extraction) and the extract is passed through an ion-exchange resin to adsorb flavor compounds thereon. The flavor compounds are then eluted in known manner. Preferred eluents include strong acids or strong bases. The resulting flavor concentrate can be neutralized and can be added to potato-chip and like products to enhance their flavor.

DETAILED DESCRIPTION OF THE INVENTION

As used herein, the term "potato-chip flavor concentrate" refers to a flavor concentrate having flavor notes characteristic of fried potato chips. While a prinicipal application of such a concentrate will involve its addition to potato chips to provide potato-chip flavor, it will be appreciated that the potato-chip flavor concentrate will find applicability in any of a variety of potato products desirably having a potato-chip-like flavor. Thus, the concentrate prepared by the process of the invention can be employed to augment or enhance the flavor attributes of such products as potato chips, potato crisps, potato sticks, potato puffs, French fries, and the like.

This invention relates to a process of preparing a potato-chip flavor concentrate comprising a sequence of steps including: (1) heating a potato source material; followed by (2) extraction; (3) cation-exchange treatment; and (4) elution of the adsorbed flavor ingredients; each of these steps are described in detail hereinafter.

In a first step, a potato source material is subjected to heating until uniformly brown in color. The potato source material from which the potato-chip flavor concentrate is prepared can include, but is not limited to, raw whole potatoes or parts thereof, such as potato sprouts or potato peels. Potato-derived materials can also be employed such as dehydrated flakes, granules or flour, doughs prepared from dehydrated potatoes, and cooked potato forms such as potato chips, French fries and the like. Thus, any potato or potato-derived source of potato-chip flavor precursors can be suitably employed. The potato material may be heated without further treatment but preferably it is comminuted to insure uniform heating exposure throughout the raw material. As used herein, comminuted material refers to potato material in a state of subdivision which will include finely-divided or pulverized material or discrete forms, e.g., bits, chunks, slices or the like. This may be done by any method known in the art to be suitable for that purpose inclusive of dicing, slicing, and other comminution techniques. Thin potato pieces, such as sliced, flaked or sheet-like pieces are preferably employed to ensure maximum flavor conversion during the heating step. Normally the potato source material will be heated in a form which permits the development of flavor materials from precursor compounds and which minimizes the loss of flavor materials by dissipation into the heating medium. Accordingly, the potato material is desirably heated in a comminuted but discrete form, for example, in the form of slices, slabs, chunks, bits or the like. Potato flour, although finely comminuted, can however, likewise be employed. An advantage of the process of the invention is that it allows the utilization of all potato parts including those which normally would constitute wastage, for example, skins, sprouts and dehydrated potato dough scraps.

The potato source material is subjected to heating until a uniformly browned potato material is obtained. During the heating step the potato constituents will react to form the desirable flavoring ingredients together with a multitude of undesirable by-products. The "heating" is excessive by reference to the conditions (time and temperature) prevailing during the manufacture, for example, of commercial potato chips. Accordingly, a marked degree of transformation of the potato product occurs and provides a material having a taste and aroma barely recognizable as having a potato origin. The heating operation is carried out under inverse time/temperature conditions, i.e., an increase in one parameter calls for a decrease of the other parameter. Time and temperature conditions are employed so as to avoid charring due to excessive heating. Obviously too-low temperatures or too-long heating times are to be avoided. Preferably the potato source material is heated at a temperature of at least 300°F for a period of from about 10 seconds to about 2 hours, more preferably at a temperature from about 375°F to about 500°F. During the heat treatment, the potato source material is dried and completely cooked. Potato-chip flavoring compounds will result from the reaction of the amino acids and the reducing sugars present in the potato raw material.

The reaction completeness, with respect to the flavoring ingredients, depends upon the operating conditions and, as set forth hereinbefore, can be optimized through the proper selection of temperature and time. Numerous side reactions take place as well and confer undesirable taste and flavor characteristics to the potato-chip material. Thus, the desirable and flavorful components characteristic of fried potato products may be completely or partially masked in effect by these side products. It will be appreciated, however, that the heating step of the invention provides a high level of the flavoring compounds which impart a potato-chip flavor to commercially available potato-chip products.

The heating can be applied using any of a variety of known heating methods including electrical, infrared, hot-air or contact heating. The heating process can be performed in a continuous or semi-continuous operation. Preferred are continuous processes such as infrared and fluidized bed heating methods (jet zone heating). The heating step produces a high amount of desirable flavoring ingredients in combination with many undesirable side-products which have to be separated prior to isolating the desirable flavor fraction.

The browned product of the heating step is extracted by contact with a solvent, e.g., water, a lower $C_{1-4}$ alcohol or a mixture thereof. The browned potato material can be extracted without further treatment but preferably is pulverized, ground, or otherwise reduced in size to facilitate the extraction operation. The extraction solvent is normally used in a weight ratio of solvent to browned potato material of from about 2:1 to about 1000:1. It will be appreciated that higher solvent-/potato material ratios can be used, although they might be less desirable from an economical point of view. Preferred solvent/potato material weight ratios are in the range from about 10:1 to about 100:1. The solvent can be water, a lower alcohol such as methyl, ethyl, n-propyl, isopropyl, or butyl alcohol, or a mixture thereof. Preferred are mixtures of water and methyl or ethyl alcohol in a weight ratio of from about 1:50 to about 50:1.

The extraction is preferably carried out under agitation at ambient temperature or at a higher temperature up to the boiling point of the particular solvent. Preferred extraction temperatures are in the range from ambient temperature, i.e., about 68°F, to about 140°F. The extraction can be carried out in a continuous or batch operation and, if desired, pressure may be applied. The extraction time can easily be optimized for a particular set of extraction conditions. For example, extraction of browned potato material, employing a potato material to solvent ratio of about 1:20, the solvent being a 1 to 1 by weight mixture of water and methanol, is substantially completed within a period of from 1 to 10 minutes at room temperature.

Upon completion of the extraction, the extract is preferably separated from the suspended water-insoluble materials by, for example, filtration, decantation, centrifugation, or any other technique known to be suitable for such purpose. The resulting extract normally will contain desired flavoring components in combination with certain undesirable side products capable of virtually completely masking the potato-chip flavoring ingredients. The desired flavoring ingredients can be separated and isolated from the undesirable by-products by submitting the extract to a cation exchange treatment. Apparently, the potato-chip flavoring ingredients are cationic in nature and, accordingly, become adsorbed, affixed, or otherwise bound to the active groups of a cation-exchange resin.

Suitable ion-exchange resins for effecting the separation of desired potato-flavor compounds from undesirable side products include any of a variety of ion-exchange resins which, in general, are comprised of a structural portion (polymer matrix) and a functional portion (ion-active group). Suitable ion-exchange resins herein are the strong-acid cation-exchange resins which are best exemplified by the principal sulfonated styrene-divinylbenzene copolymer products which are commercially available under a number of trade designations (Amberlite IR-120, Amberlite IR-200, Dowex 50, Dowex 50W, Dowex MPC-1, Duolite C-20, Duolite C-25, Ionac C-240, and Ionac C-250). These strong-acid cation-exchange resins permit ready adsorption of the nitrogenous and cationic flavor compounds so as to effect facile separation. Normally, desirable separation is readily effected by the employment of a cation-exchange resin having a cation-exchange capacity of at least about 20 milliequivalents per 100 grams of the cation-exchange resin. Preferred are those having a cation-exchange capacity of at least about 200 milliequivalents per 100 grams of cation-exchange resin.

Especially preferred are the cationic-exchange resins commercially available under the trade designation AG 50W (BIO.RAD Laboratories, Richmond, California). It will be appreciated, however, that any of a number of cation-exchange resins can be employed and that the selection of a suitable resin can be readily effected by those skilled in the art. A description of ion-exchange resins, their functionality and examples of materials suitable herein can be found in Kirk-Othmer *Encyclopedia of Chemical Technology*, Vol. 11, 2d Ed. (1966), pp. 871-899.

Application of the extract to the ion-exchange resin can be carried out by admixing the extract with the resin material, or more usually, by passing the extract through a bed of the resin. The ion exchange can be conducted in a continuous process or in a batch operation. It can be performed in a single step or in a multiple operation employing a series of columns filled or partially filled with the particular exchange resin. Subsequent to the extraction, the adsorbent ion-exchange resin is preferably rinsed several times to eliminate undesirable by-products which are not adsorbed by the resin.

The potato-chip flavoring ingredient is then eluted from the cation-exchange resin by means of a suitable eluent. Preferably, a strong acid or strong base is employed. Examples of suitable eluents include hydrochloric, sulfuric, phosphoric and nitric acid; alkali metal and alkaline earth metal hydroxides, and ammonium hydroxide. Partially or completely neutralized salts (e.g., sodium, lithium, calcium, magnesium salts) of said strong bases and strong acids can also be used. Salts of food-compatible metals will be employed. The elution is performed by contacting the flavor-laden resin with the eluent. For example, this can be done by using a column packed with the flavor-laden resin or by treating the flavor-laden resin in a batch of said eluent.

The eluate containing the potato-chip flavoring components is preferably, and if needed, neutralized to a pH of about 7. It may also be desirable to concentrate the flavoring solution. To that end, all concentration techniques known in the art suitable for that purpose can be used. Examples thereof include thin layer distillation, conventional distillation, freeze drying or vacuum concentrating techniques.

The following Examples are illustrative of the invention and serve to facilitate its understanding.

EXAMPLE 1

Seven pounds of raw sliced potatoes were heated at 400°F for 40 minutes in a conventional infrared oven, resulting in 1.4 pounds of browned potato material. The potato material was then comminuted in the presence of 100 pounds of warm water in a blender for about 5 minutes, followed by centrifugation to separate the potato solids from the extract. The flavor-containing extract was then passed through a column packed with a cation-exchange resin (AG 50W-X8) supplied by BIO.RAD Laboratories and having a cation-exchange capacity of 510 milliequivalents per 100 grams of cation-exchange material to adsorb the flavoring ingredients onto the resin. The flavor laden resin was then rinsed by passing water through the columnar bed until the rinsing solution remained clear. An aqueous alkaline solution (2N sodium hydroxide) was passed through the column to elute the adsorbed flavoring materials. The resulting eluate containing the desirable flavoring ingredients was then neutralized with hydrochloric acid to a pH of about 7. This flavor concentrate was added to a potato dough prepared by mixing water with the dehydrated potatoes that had been obtained from 335 pounds of raw potatoes. From the dough were prepared 67 pounds of potato chips by conventional processing techniques. The resulting potato chip products had greatly improved flavor and good eating quality by reference to comparable commercial potato chips to which no flavor was added.

Results similar to those of Example 1 are also obtained when the raw sliced potatoes are replaced with a potato dough prepared from dehydrated potatoes and in the form of sheets or flakes; or dices or slabbed raw potatoes.

Results equivalent to those of Example 1 are also obtained when instead of the conventional infrared radiation oven, one employs a fluidized bed with hot-air heating.

A potato chip concentrate similar to the one obtained from Example 1 can also be prepared when the extraction solvent is a mixture of water/methanol; water/ethanol; water/isopropanol; water/n-propanol; or water/butanol where the weight ratio of water/alcohol for each combination is any of 50:1; 30:1; 15:1; 10:1; 5:1; 1:5; 1:10; 1:20; 1:30; or 1:40.

Substituting the sodium hydroxide eluent of Example 1 by an equivalent quantity of potassium hydroxide, ammonium hydroxide, sulfuric acid, hydrochloric acid, phosphoric acid, sodium or potassium chloride or potassium sulfate, respectively, will produce a flavor concentrate similar to that of Example 1.

EXAMPLE 2

Samples of potato material were employed in the preparation of a flavor concentrate. The potato material samples comprised potato chips fried from sliced raw potatoes, potato chips formulated from dehydrated potatoes and raw potato slices. Each sample was heated in an oven at 400°F until the material was dark brown in appearance and possessed a strong roasted flavor (40 minutes in each instance). The browned potato material was then pulverized, extracted, passed through a cation exchange resin column and eluted as described in Example 1. The concentration of the flavoring material in the extract was determined by quantitative gas chromatographic analysis of three of the major potato-chip flavoring ingredients, namely; trimethylpyrazine; ethyl-3,6-dimethylpyrazine and ethyl-3,5-dimethylpyrazine. The results were expressed in $\mu g$ (micrograms) of flavoring component/50 g. potato material.

| | µg of Pyrazine Derivative/50 g. Potato Material | | |
|---|---|---|---|
| | trimethyl | ethyl 3,6 dimethyl | ethyl 3,5 dimethyl |
| Potato chips from dehydrated potatoes | | | |
| as commercially sold | 50 | 30 | 6 |
| heated at 400°F, 40 minutes | 220 | 290 | 90 |
| Potato chips from from potato slices | | | |
| as commercially sold | 20 | 10 | 5 |
| heated at 400°F, 40 minutes | 105 | 70 | 40 |
| Raw potato slices | | | |
| untreated | 0 | 0 | 0 |
| heated at 400°F, 40 minutes | 270 | 250 | 90 |

The above data clearly shows that potato source materials treated according to the process herein yields unexpectedly and significantly enhanced flavor levels.

What is claimed is:

1. A process for producing a potato-chip flavor concentrate comprising:

a. heating a potato source material until uniformly brown in color;
b. extracting flavor ingredients from the browned product of step (a) by contacting with a solvent selected from the group consisting of water, lower alcohols and mixtures thereof;
c. contacting the extract of step (b) with a cation-exchange resin, thereby to adsorb flavoring compounds onto the resin; and
d. eluting the adsorbed flavoring compounds from the cation-exchange resin.

2. The process of claim 1 wherein the eluate of step (d) is neutralized to a pH of about 7.

3. The process of claim 1 wherein the potato source material is comminuted and is heated to a temperature of at least about 300°F for a period of from about 10 seconds to about 2 hours.

4. The process of claim 1 wherein the browned potato source material is pulverized prior to extraction and the weight ratio of browned potato source material to extraction solvent is in the range from about 1:10 to about 1:100.

5. The process of claim 4 wherein the solvent is a mixture of water and lower alcohol in a weight ratio of from about 1:50 to about 50:1.

6. The process of claim 5 wherein the extract is separated from the browned potato source solids prior to being contacted with the cation-exchange resin.

7. The process of claim 6 wherein the adsorbed flavoring compounds are eluted from the cation-exchange resin by a strong base or strong acid eluent.

8. A process for producing a potato-chip flavor concentrate comprising:

a. heating thin pieces of potato source material to a temperature of at least about 300°F until uniformly brown in color;
b. pulverizing the browned potato source material and extracting flavor ingredients therefrom by contacting with a water-and-alcohol extraction solvent, the weight ratio of water to alcohol being in the range of from about 1:50 to about 50:1;
c. separating the extract of step (b) from the water-insoluble potato source material;
d. contacting the extract with a cation-exchange resin;
e. eluting the adsorbed flavor ingredients from the cation-exchange resin with a strong base or a strong acid eluent; and
f. neutralizing the eluate of step (e) to a pH of about 7.

9. The process of claim 8 wherein the potato source material is heated to a temperature in the range of from about 375°F to about 500°F.

10. The process of claim 8 wherein the weight ratio of browned potato source material to extraction solvent is in the range from about 1:10 to about 1:100.

* * * * *